United States Patent Office 3,299,050
Patented Jan. 17, 1967

---

3,299,050
THIAXANTHENE DERIVATIVES
Ernst Jucker, Ettingen/Basel Land, Anton Ebnöther, Basel, and Andre Stoll, Birsfelden, Switzerland, assignors to Sandoz Ltd., Basel, Switzerland
No Drawing. Filed June 18, 1963, Ser. No. 288,604
Claims priority, application Switzerland, Sept. 13, 1960, 10,389/60; Nov. 30, 1960, 13,392/60; June 23, 1961, 7,350/61
1 Claim. (Cl. 260—240)

The present application is a continuation-in-part of copending application Serial No. 130,778, filed August 11, 1961, now abandoned, which has been abandoned since the filing of the present application.

The present invention relates to new therapeutically useful thiaxanthene derivatives, their physiologically acceptable salts with acids and a process for their production.

The new thiaxanthene derivatives of the present invention correspond to the formula:

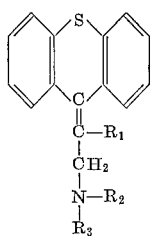

wherein $R_1$ represents a member selected from the group consisting of hydrogen and lower alkyl, each of $R_2$ and $R_3$ taken individually represents lower alkyl (e.g. methyl, ethyl, propyl, butyl, etc.), $R_2$ and $R_3$ taken collectively with the nitrogen atom to which they are joined are a member selected from the group consisting of pyrrolidino, piperidino and morpholino, and $R_2$ together with $R_1$ represents a member selected from the group consisting of dimethylene and tetramethylene.

The aforesaid thiaxanthene derivatives of the Formula I are prepared according to this invention by reacting thiaxanthone with a compound of the formula:

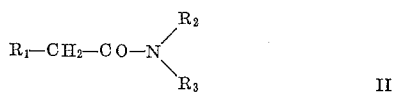

wherein $R_1$, $R_2$ and $R_3$ have the above significance, the reaction product of the formula:

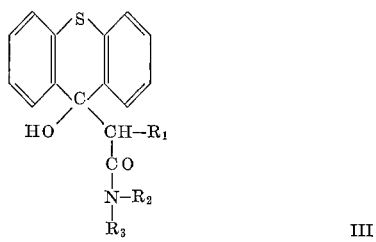

wherein $R_1$, $R_2$ and $R_3$ have the above significance, is reduced to give a 9-hydroxy-thiaxanthene derivative of the formula:

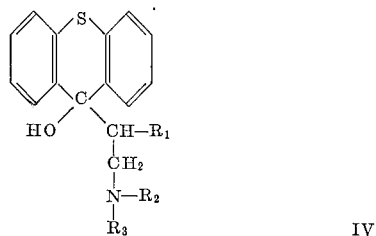

wherein $R_1$, $R_2$ and $R_3$ have the above significance.

The intermediate compound of Formula IV is then treated with a dehydrating agent, and, when it is desired to produce a physiologically acceptable acid addition salt, reaction with a physiologically acceptable organic or inorganic acid is effected by treating the base with the selected acid.

Compounds of the Formula II which are suitable as starting materials are aliphatic diamides, e.g. dimethylacetamide, diethylacetamide, di-n-propylacetamide, di-isopropylacetamide or dimethylpropionic acid amide or heterocyclic amides of acetic acid, e.g. the pyrrolidide, the piperidide or the morpholide. Lactams substituted in the 1-position by a lower alkyl group may also be used for the condensation reaction with thiaxanthone. Compounds of this type are for example 1-methyl-, 1-ethyl- or 1-isopropyl-2-oxo pyrrolidine, 1-methyl-, 1-ethyl- or 1-isopropyl-2-oxo piperidine or N-methyl-ε-caprolactam.

The process may, for example, be effected as follows: A compound of Formula II, e.g. N,N-dimethyl-propionamide or N-methyl-ε-caprolactam, is added to a suspension of an alkali metal amide, e.g. sodium or potassium amide, in liquid ammonia, and thiaxanthone which may be suspended in tetrahydrofuran, subsequently added. After stirring for two hours at —35° the reaction mixture is poured into a solution of ammonium chloride in liquid ammonia, the mixture stirred for a further 5 to 10 minutes and a suitable organic solvent, e.g. diethyl ether, added. The ammonia is then evaporated, the reaction product which has meanwhile reached room temperature, poured into cold water and the organic layer decanted. To remove the unreacted thiaxanthone the dried organic solution is evaporated and the residue treated with hot tetrahydrofuran, thiaxanthone crystallizing. After filtration the compound of Formula III is isolated from the mother liquor by known methods and purified.

The reduction of the keto group is advantageously effected with lithium aluminum hydride in an inert organic solvent, e.g. tetrahydrofuran, at a temperature of about 0 to about 60° C. A saturated sulfate solution is then added to the reaction mixture, the inorganic compounds filtered off and the compound of Formula IV isolated from the filtrate by known methods. Compound IV may be purified by crystallization and if desired salification may be effected.

The splitting off of water can be effected by heating the compounds of Formula IV with a strong acid, e.g. concentrated hydrochloric acid and/or glacial acetic acid. Compound I can be isolated and purified according to known methods and if desired salified.

The compounds produced in accordance with the invention are crystalline or oily at room temperature. They are basic compounds which, with inorganic or organic acids, form stable, crystalline salts at room temperature. Examples of inorganic or organic acids are hydrochloric, hydrobromic, hydriodic, sulfuric, acetic, fumaric, maleic, malic, tartaric, succinic methanesulfonic, benzoic and naphthalene-1,5-sulfonic.

The new thiaxanthenes of Formula I and their salts have a strong histamine inhibiting effect and have the further advantage that this is not accompanied by any undesirable side effects, e.g. a dry feeling in the mouth or sleepiness. The new compounds may thus be used as antihistaminics. In addition the compounds also exhibit pharmacodynamic properties which are characteristic of the anti-depressive compounds (inhibition of the sedative actions of reserpine, potentiation of the effects of epinephrine). The new compounds may therefore also be used as antidepressives.

In the following non-limitative examples all temperatures are stated in degrees centigrade and are uncorrected.

EXAMPLE 1

(a) α-[9'-hydroxy-thiaxanthyl-(9')]-dimethyl propionamide

30.0 g. of N,N-dimethyl propionamide are added to a suspension of 14.1 g. of pulverised sodium amide in 300 cc. of liquid ammonia, whilst stirring, at −35° and after 10 minutes a suspension of 38.4 g. of thiaxanthone in 120 cc. of tetrahydrofuran is added. After stirring for two hours at −35° the reaction product is poured into a solution of 21 g. of ammonium chloride in 150 cc. of liquid ammonia and the mixture stirred for a further 10 minutes. 250 cc. of ether are added to the mixture and the ammonia is evaporated. As soon as room temperature is reached, the mixture is poured into 1000 cc. of cold water with stirring, the ethereal layer decanted, washed twice with 500 cc. of water, dried over sodium sulphate and concentrated by evaporation. The residue is dissolved in hot tetrahydrofuran, the unreacted thiaxanthone crystalising. After filtration the mother liquor is evaporated and the residue crystallised a number of times from ethanol. The compound melts between 116 and 117°.

(b) 2-[9'-hydroxy-thiaxanthyl-(9')]-1-dimethyl aminopropane

A solution of 40 g. of α-[9'-hydroxy-thiaxanthyl-(9')]-N,N-dimethyl propionamide in 300 cc. of tetrahydrofuran is added dropwise with stirring to a suspension of 7.87 g. of lithium aluminium hydride in 100 cc. of absolute tetrahydrofuran at 5 to 10°. The mixture is subsequently heated to the boil at reflux for a further 2 hours, cooled and a saturated solution of sodium sulphate added dropwise whilst cooling until a precipitate which may easily be filtered is obtained. This precipitate is filtered off and washed a number of times with hot tetrahydrofuran. The filtrates are evaporated and the residue crystallised from ethanol. The 2-[9'-hydroxy-thiaxanthyl-(9')]-1-dimethyl aminopropane melts at 79–81.5°.

EXAMPLE 2

2-[thiaxanthylidene-(9')]-1-dimethyl aminopropane

A solution of 2.6 g. of 2-[9'-hydroxy-thiaxanthyl-(9')]-1-dimethyl aminopropane in 25 cc. of glacial acetic acid and 10 cc. of concentrated hydrochloric acid is heated to the boil at reflux for ½-hour. After removal of the solvent in a vacuum the residue is dissolved in 25 cc. of 3 N hydrochloric acid, the solution filtered through highly purified diatomaceous earth and evaporated in a vacuum. After rubbing the residue with acetone the hydrochloride crystallises. After recrystallising three times from acetone, the salt melts at 211–213° (decomposition).

EXAMPLE 3

(a) α-[9'-hydroxy-thiaxanthyl-(9')]-N-methyl-ε-caprolactam

33.2 g. of N-methyl-ε-caprolactam are added to a suspension of 14.1 g. of pulverised sodium amide in 300 cc. of liquid ammonia at −35° whilst stirring and after 10 minutes a suspension of 38.4 g. of thiaxanthone in 120 cc. of tetrahydrofuran is added to the mixture. After stirring for 2 hours at −35° the reaction product is poured into a solution of 21 g. of ammonium chloride in 150 cc. of liquid ammonia and the mixture stirred for a further 10 minutes. 250 cc. of ether are then added to the mixture and the ammonia is evaporated. As soon as the reaction product reaches room temperature it is poured into 1000 cc. of cold water. After addition of 300 cc. of methylene chloride the organic layer is separated from the mixture and washed twice with 500 cc. of water. The solution is concentrated by evaporation after drying over sodium sulphate and the resulting residue dissolved in hot tetrahydrofuran, the unreacted thiaxanthone crystallising and being removed by filtration. After evaporation of the filtrate the residue is dissolved in 300 cc. of the hot acetone. The compound crystallising at room temperature is subsequently recrystallised twice from ethanol. Melting point 168.5–171°.

(b) 3-[9'-hydroxy-thiaxanthyl-(9')]-1-methyl hexahydroazepine

12.6 g. of α-[9'-hydroxy-thiaxanthyl-(9')]-N-methyl-ε-caprolactam are reduced with 2.2 g. of lithium aluminium hydride in tetrahydrofuran as described in Example 1b. The 3-[9'-hydroxythiaxanthyl-(9')]-1-methyl hexahydroazepine is recrystallised four times from ethanol. Melting point 108–109°.

EXAMPLE 4

3-[thiaxanthylidene-(9')]-1-methyl hexahydroazepine

The splitting off of water from 3-[9'-hydroxy-thiaxanthyl-(9')]-1-methyl hexahydroazepine is effected in a manner analogous to that described in Example 2. After removal of the solvent in a vacuum, the residue is dissolved in 30 cc. of hot methanol and the solution cooled, the crude hydrochloride crystallising. For the purpose of purification the salt is dissolved in a mixture of 30 cc. of ethanol and 60 cc. of water whilst hot and filtered at 30°. After standing for a few hours in the cold the hydrochloride crystallises. It is crystallised three times from ethanol. Melting point 235–238° (decomposition). The free base is obtained from the hydrochloride according to methods known per se. Melting point 86–87.5° after recrystallisation from ethanol.

EXAMPLE 5

(a) 9-hydroxy-thiaxanthyl-(9)-acetic acid pyrrolidide

19.2 g. of thiaxanthone are added portionwise to a suspension of 10.5 g. of pulverised sodium amide in 40 cc. of 1-acetyl pyrrolidine at 0 to 5° whilst stirring. The mixture is stirred for a further hour at 0°, 40 cc. of absolute tetrahydrofuran added and the mixture stirred for a further 2 hours at 20 to 25°. The reaction mixture is then poured into 1000 cc. of ice cold water. After addition of 300 cc. of chloroform the mixture is stirred for a further 10 minutes and the reaction mixture filtered through highly purified diatomaceous earth. The chloroform layer is then shaken twice with 1000 cc. of water, dried over sodium sulphate and evaporated. The residue is recrystallised three times from ethanol. Melting point 138.5–140°.

(b) 1-[9'-hydroxy-thiaxanthyl-(9')]-2-[pyrrolidino-(1'')] ethane

12.6 g. of 9-hydroxy-thiaxanthyl-(9)-acetic acid pyrrolidide are reduced with 4.8 g. of lithium aluminium hydride in tetrahydrofuran in a manner analogous to that described in Example 1b. The compound is recrystallised three times from benzene. Melting point 163–166°.

EXAMPLE 6

1-[thiaxanthylidene-(9')]-1-]pyrrolidino-(1'')] ethane

A solution of 7.3 g. of 1-[9'-hydroxy-thiaxanthyl-(9')]-2-[pyrrolidino-(1')] ethane in 150 cc. of glacial acetic acid is heated to the boil at reflux for one hour. After removal of the solvent, 75 cc. of 5% acetic acid are added to the residue and the solution is filtered through highly purified diatomaceous earth. After bringing the solution to a pH value of 9 to 10, the solution is shaken with 50 cc. of ether. The ether extract is evaporated after drying over potassium carbonate and the residue distilled in a bulb tube at a pressure of 0.01 mm. of Hg, the compound distilling over at 182–193°. The compound is recrystallised twice from hexane. Melting point 90–91°.

*Acid tartrate.*—Melting point 190–192° (decomposition) after recrystallising twice from ethanol containing 1% of tartaric acid.

EXAMPLE 7

*(a) 9-hydroxy-thiaxanthyl-(9)-acetic acid morpholide*

The compound is obtained from 50 cc. of 1-acetyl morpholine and 20.4 g. of thiaxanthone in a manner analogous to that described in Example 5a. After recrystallising three times from ethanol the compound melts at 137–139°.

*(b) 1-[9'-hydroxy-thiaxanthyl-(9')]-2-[morpholino-(4")] ethane*

The process is effected as described in Example 1b, 25.5 g. of 9-hydroxy-thiaxanthyl-(9)-acetic acid morpholide being reduced with 9.8 g. of lithium aluminium hydride in tetrahydrofuran. After recrystallising three times from benzene or isopropanol the compound melts at 142–143.5°.

EXAMPLE 8

*1-[thiaxanthylidene-(9')]2-[morpholino-(4")] ethane*

A solution of 7.9 g. of 1-[9'-hydroxy-thiaxanthyl-(9')]-2-[morpholino-(4")] ethane in 200 cc. of glacial acetic acid containing 80 cc. of concentrated hydrochloric acid is heated to the boil at reflux for 5 minutes. After removing the solvent at a pressure of 15 mm. of Hg, 50 cc. of water are added to the residue and the solution is filtered through highly purified diatomaceous earth. After bringing the solution to a pH value of 9 to 10, it is shaken with 70 cc. of ether. The ether extract is evaporated after drying over potassium carbonate. The resulting 1-[thiaxanthylidene-(9')]-2-[morpholino-(4")] ethane melts at 117–119°, after recrystallising three times from ethanol.

*Hydrochloride.*—Melting point 194–196° (decomposition) after recrystallising three times from ethanol.

EXAMPLE 9

*(a) 9-hydroxy-thiaxanthyl-(9)-acetic acid dimethyl amide*

10 g. of finely ground thiaxanthone are added portionwise, whilst stirring, to a suspension of 3.8 g. of pulverised sodium amide in 100 cc. of N,N-dimethyl acetamide at −30°. The reaction mixture is left to stand until it has reached room temperature and is then stirred for a further hour at this temperature (20°). The red solution containing colourless crystals is then poured into 500 cc. of water and the formed residue filtered off and dried. The unreacted thiaxanthone is removed by fractional crystallisation from ethyl acetate and ethanol. 9-hydroxy-thiaxanthyl-(9)-acetic acid dimethyl amide crystallises from the mother liquor in the form of prisms having a melting point of 127–128°.

*(b) 2-[9'-hydroxy-thiaxanthyl-(9')]-1-dimethyl aminoethane*

A solution of 15 g. of 9-hydroxy-thiaxanthyl-(9)-acetic acid dimethyl amide in 80 cc. of tetrahydrofuran is added dropwise, whilst stirring, to a suspension of 3 g. lithium aluminium hydride in 25 cc. of tetrahydrofuran at 5 to 10°. The mixture is stirred for 2 hours at room temperature and then heated to the boil at reflux for one hour, cooled and a saturated sodium sulphate solution added dropwise whilst cooling until a precipitate forms which is filtered off and washed a number of times with hot tetrahydrofuran. The filtrates are evaporated and the residue is recrystallised from benzene/petroleum ether or hexane. Melting point 94–95°.

The hydrochloride is produced as follows: A solution of the base in acetone is made just acid with ethereal hydrogen chloride, whereupon the hydrochloride crystallises. The solution is filtered and the salt dried over phosphorus pentoxide.

Upon heating, the hydrochloride splits off water, 2-[thiaxanthylidene-(9')]-1-dimethyl aminoethane hydrochloride resulting. Melting point 218–219°.

EXAMPLE 10

*2-[thiaxanthylidene-(9')]-1-dimethyl aminoethane*

8 g. of 2-[9'-hydroxy-thiaxanthyl-(9')]-1-dimethyl aminoethane are heated to the boil at reflux with 40 cc. of concentrated hydrochloric acid for one hour. The reaction solution is evaporated in a vacuum and the residue recrystallised from ethanol. 2-[thiaxanthylidene-(9')]-1-dimethyl aminoethane hydrochloride melts at 218–219°.

EXAMPLE 11

*(a) 3-[9'-hydroxy-thiaxanthyl-(9')]-1-methyl pyrrolidone-(2)*

The 3-[9'-hydroxy-thiaxanthyl (9')]-1-methyl pyrrolidone-(2) is produced from 6.4 g. of thiaxanthone and 20 cc. of 1-methyl pyrrolidone-(2) in the presence of 3.5 g. of sodium amide at a temperature of no higher than 0° in a manner analogous to that described in Example 5a. The water-insoluble residue is taken up in chloroform, the chloroform solution washed a number of times with water, dried over sodium sulphate and then evaporated in a vacuum. After recrystallising three times from isopropanol the compound melts at 165.5–167.5°.

*(b) 3-[9'-hydroxy-thiaxanthyl-(9')]-1-methyl pyrrolidine*

4.2 g. of 3-[9'-hydroxy-thiaxanthyl-(9')]-1-methyl pyrrolidone-(2) are reduced with 0.8 g. of lithium aluminium hydride in tetrahydrofuran in a manner analogous to that described in Example 1b. The 3-[9'-hydroxy-thiaxanthyl-(9')]-1-methyl pyrrolidine is recrystallised three times from ethanol. Melting point 131–133.5°.

The neutral fumarate crystallises from aqueous methanol with 1 mol of water of crystallisation. Melting point 185° (decomposition).

EXAMPLE 12

*3-[thiaxanthylidene-(9')]-1-methyl pyrrolidine*

The splitting off of water from 3-[9'-hydroxy-thiaxanthyl-(9')]-1-methyl pyrrolidine is effected by heating the compound dissolved in glacial acetic acid with concentrated hydrochloric acid for two hours in a manner analogous to that described in Example 2. The reaction solution is then evaporated in a vacuum and the resulting hydrochloride converted to the free base. After recrystallizing three times from ethyl acetate the 3-[thiaxanthylidene-(9')]-1-methyl pyrrolidine melts at 103–105°.

Acid tartrate ($C_{18}H_{17}NS \cdot C_4H_6O_6$), melting point 152–154° (decomposition) from ethanol.

What is claimed is:

A process for the preparation of a thiaxanthene derivative of the formula:

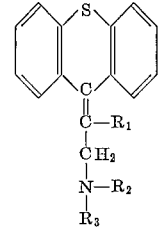

wherein $R_1$ represents a member selected from the group consisting of hydrogen and lower alkyl, each of $R_2$ and $R_3$ taken individually represents lower alkyl, $R_2$ and $R_3$ taken collectively with the nitrogen atom to which they are joined are a member selected from the group consisting of pyrrolidino, piperidino and morpholino, and $R_2$ together with $R_1$ represents a member selected from the group consisting of dimethylene and tetramethylene, and non-toxic therapeutically useful salts thereof with an acid selected from the group consisting of hydrochloric acid, hydrobromic acid, hydriodic acid, sulfuric acid, acetic acid, fumaric acid, maleic acid, malic acid, tartaric acid, succinic acid, methanesulfonic acid, benzoic acid and naphthalene-1,5-disulfonic acid, which comprises condensing thiaxanthone in tetrahydrofuran with a compound of the formula:

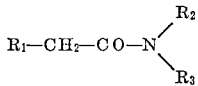

$R_1$, $R_2$ and $R_3$ having the above significance, and with an alkali amide condensing agent at a temperature of −35° C. to +5° C., said alkali amide condensing agent in liquid ammonia and selected from the group consisting of sodium amide and potassium amide, treating the condensation mixture by pouring it into an excess of cold water, extracting the water mixture with an inert volatile organic solvent, and separating by crystallizing the keto-substituted thiaxanthone from said condensation, reducing said keto-substituted thiaxanthone with lithium aluminum hydride in absolute tetrahydrofuran at 0° to 60° C. to produce a compound to the formula:

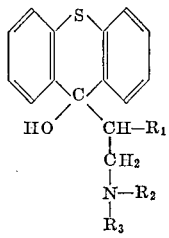

wherein $R_1$, $R_2$ and $R_3$ have the above significance, and thereafter dehydrating said reduced compound to remove the 9'-hydroxy group by heating to reflux with a dehydrating agent selected from the group consisting of concentrated hydrochloric acid and acetic acid.

References Cited by the Examiner

UNITED STATES PATENTS

| | | | |
|---|---|---|---|
| 2,951,082 | 8/1960 | Sprague et al. | 260—328 |
| 2,996,503 | 8/1961 | Sprague et al. | 260—247.1 |
| 3,046,283 | 7/1962 | Engelhardt | 260—328 |

FOREIGN PATENTS 829,763  3/1960  Great Britain.

OTHER REFERENCES

Peterbaugh et al.: J. Am. Chem. Soc., vol. 75 (1953), pp. 2415–17.

Winthrop et al.: J. Org. Chem., vol. 27 (January 1962), p. 230–40.

WALTER A. MODANCE, *Primary Examiner.*

JOHN D. RANDOLPH, *Examiner.*

H. I. MOATZ, *Assistant Examiner.*